(12) United States Patent
Brusilovsky et al.

(10) Patent No.: US 7,050,810 B2
(45) Date of Patent: May 23, 2006

(54) INSTANT PRESENCE SYSTEM FOR A GUARANTEED CALL CONNECTION

(75) Inventors: Alec Brusilovsky, Naperville, IL (US); Vijay Kumar Gurbani, Lisle, IL (US); Ajay Jain, Aurora, IL (US); Warren Alan Montgomery, DeKalb, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 464 days.

(21) Appl. No.: 10/200,715

(22) Filed: Jul. 22, 2002

(65) Prior Publication Data

US 2004/0203795 A1    Oct. 14, 2004

(51) Int. Cl.
*H04Q 7/20* (2006.01)
*H04M 11/04* (2006.01)

(52) U.S. Cl. ............... 455/445; 455/456.1; 455/440; 455/404.2

(58) Field of Classification Search ............... 455/425, 455/417, 414.2, 415, 407, 457, 412.1, 412.2, 455/404.2, 445, 456.1, 413, 67.1, 422.1, 455/440, 453; 705/30; 379/142.04; 709/230; 342/357.09
See application file for complete search history.

(56) References Cited

U.S. PATENT DOCUMENTS

| | | | | |
|---|---|---|---|---|
| 5,255,183 A * | 10/1993 | Katz | ................ | 705/30 |
| 5,625,668 A * | 4/1997 | Loomis et al. | ................ | 455/456.5 |
| 5,815,808 A * | 9/1998 | Valentine | ................ | 455/422.1 |
| 6,226,367 B1 * | 5/2001 | Smith et al. | ................ | 379/142.04 |
| 6,334,054 B1 * | 12/2001 | Link et al. | ................ | 455/413 |
| 6,397,073 B1 * | 5/2002 | Hottinen | ................ | 455/456.5 |
| 6,505,048 B1 * | 1/2003 | Moles et al. | ................ | 455/456.1 |
| 6,529,735 B1 * | 3/2003 | De Brito | ................ | 455/456.1 |
| 6,625,457 B1 * | 9/2003 | Raith | ................ | 455/456.1 |
| 6,697,630 B1 * | 2/2004 | Corwith | ................ | 455/457 |
| 6,757,521 B1 * | 6/2004 | Ying | ................ | 455/67.11 |
| 6,873,846 B1 * | 3/2005 | Gerber et al. | ................ | 455/440 |
| 2001/0051525 A1 * | 12/2001 | Rayne | ................ | 455/453 |
| 2002/0032787 A1 * | 3/2002 | Overton et al. | ................ | 709/230 |
| 2002/0145561 A1 * | 10/2002 | Sandhu et al. | ................ | 342/357.09 |
| 2003/0119522 A1 * | 6/2003 | Barclay et al. | ................ | 455/456 |
| 2004/0203842 A1 * | 10/2004 | Hanninen et al. | ................ | 455/456.1 |

* cited by examiner

*Primary Examiner*—William Trost
*Assistant Examiner*—Kiet Doan

(57) ABSTRACT

The instant presence system authoritatively determines the present communication location of a subscriber, who may be at any of a number of possible locations. When the subscriber changes their location, they can use a subscriber communication device that is operational at their new location to update their point of presence on the telephone communication network. The instant presence system enables the communication network to complete a communication connection from a calling party to the called party with certainty. The calling party therefore can reach the called party with certainty by simply dialing a single listed directory number associated with the called party, relying on the instant presence system to complete the call connection to the called party, regardless of the present location of the called party.

10 Claims, 3 Drawing Sheets

INSTANT PRESENCE SYSTEM FOR A GUARANTEED CALL CONNECTION

FIELD OF THE INVENTION

This invention relates to telephone communication networks and in particular to a system that makes use of an Instant Messaging functionality to identify a present location of a subscriber.

Problem

It is a problem in telephone communication networks to identify the present location of a subscriber to thereby enable the telephone communication network to extend an incoming call to the subscriber regardless of the present location of the subscriber. Subscribers can be equipped with a multitude of communication devices, each having their own identity, and associated communication network that serves the communication device. The subscriber can also roam to locations where they have telephone service available, but the subscriber is not listed under their subscriber identification, since they are simply visitors at this location.

There is presently a number of call forwarding features in use in various wire-line based telephone communication networks. However, these call forwarding features typically only operate within the confines of a single telephone switching system and either follow a predefined subscriber location search sequence or rely on the subscriber to manually enter the telephone number of their next location within the same telephone switching system so an incoming call can be extended to this location. In the former case, the telephone communication network attempts to extend the incoming call to a predetermined series of subscriber locations via a process that rings the subscriber locations either seriatim or simultaneously. In this processes, a significant amount of telephone communication network resources are expended in an attempt to locate the subscriber, with no assurance that the subscriber is located at any of those predetermined numbers. In the latter case noted above, the subscriber must remember to manually input the telephone number of the location to which the subscriber travels prior to departing their home location, since the call forwarding number must be input only from the subscriber's home telephone. This process represents a more efficient use of telephone communication network resources, but is prone to failure due to the lack of timely and consistent data input by the subscriber and the requirement that the call forwarding number be input from the subscriber's home location.

In cellular communication networks, the cellular telephone station set self-registers with the cellular communication network to identify the present physical location of the cellular telephone station set. However, there is no guarantee that the subscriber is co-located with the cellular telephone station set and may not be available to answer an incoming call. In addition, an incoming call to the subscriber at the subscriber's cellular telephone station set is not forwarded to any wire-line based locations, since the cellular communication network has no information regarding the present location of the subscriber when the subscriber is served by a wire-line based telephone communication network.

Thus, the present proliferation of telephone communication devices has rendered the task of tracking the present location of a subscriber difficult to accomplish with any degree of certainty.

Instant Messaging is a service provided by Internet Service Providers that allows two people to communicate in "real time" over the Internet, superceding the pace of e-mail. Instant Messaging software uses modern TCP/IP protocols and allows a subscriber to track when another person logs on and logs off of the Internet. Some software also gives the subscriber the convenience of sending files back and forth to one another in real time. Instant Messaging is not a new concept, since it has been used in Bulletin Board Systems to support real time conversations with the Internet Service Provider System Operator. In addition, Unix talk programs and Internal Relay Chat programs have been around for an extensive period of time.

For the subscriber to receive the knowledge that someone the subscriber knows (subscriber contact) is on the Internet at the same time as the subscriber, the subscriber must transmit either a screen name or email address to identify the subscriber contact to the Internet Service Provider. Using this subscriber contact identification information, the Internet Service Provider is able to track if that person is online at the same time as the subscriber. Instant Messaging primarily works in a manner that is similar to a client/server model. In this environment, the client connects to a central "server" that verifies the subscriber's identity and registers the subscriber as being online then, when other users register and connect, they know that the subscriber is logged on because the server knows that the subscriber is online. Therefore, an individual can transmit an Instant Message to another party who is also logged on to the network and receive an instant reply.

Software developers of Instant Messaging programs are running into one problem, which is programs use incompatible protocols and do not inter-operate with one another. For example an ICQ user cannot use his software to message someone using AOL Instant Messenger or Infoseek's Instant Messaging, also known as PeopleLink. So the other person that you want to be able to contact must have the identical software that you have in order to correspond with you. Another unresolved problem is privacy, where the subscriber contact is busy and/or does not want to be disturbed, except for a few select individuals. In Instant Messaging, if someone signs on and has the capability to tell that you are also online, they can contact you unless your instant messaging software is not running. Therefore, the Instant Messaging service operates as a community chat group, with all parties on a subscriber's contact list being identified to the subscriber as available for contact, rather than a point-to-point communication service, where a subscriber-initiated communication is delivered to the subscriber contact, regardless of their location. The Internet Service Providers, as noted above, use proprietary protocols and the use of the Instant Messaging service is therefore limited to only Internet subscribers who have subscribed to the same Internet Service provider as the subscriber.

Solution

The above-described problems are solved and a technical advance achieved by the present instant presence system which authoritatively determines the present communication location of a subscriber, who may be at any of a number of possible locations. When the subscriber changes their location, they can use a subscriber communication device that is operational at their new location to update their point of presence on the telephone communication network. The instant presence system enables the communication network to complete a communication connection from a calling party to the called party with certainty. The calling party therefore can reach the called party with certainty by simply dialing a single listed directory number associated with the called party, relying on the instant presence system to complete the call connection to the called party, regardless of the present location of the called party. At least one set of incoming call filters is used to reduce the use of this feature to individually identified calling parties who are pre-authorized by the calling party or members of a group that is authorized by the called party.

DETAILED DESCRIPTION

Subscriber Terminal Equipment and Communications Environment

Figure 1:
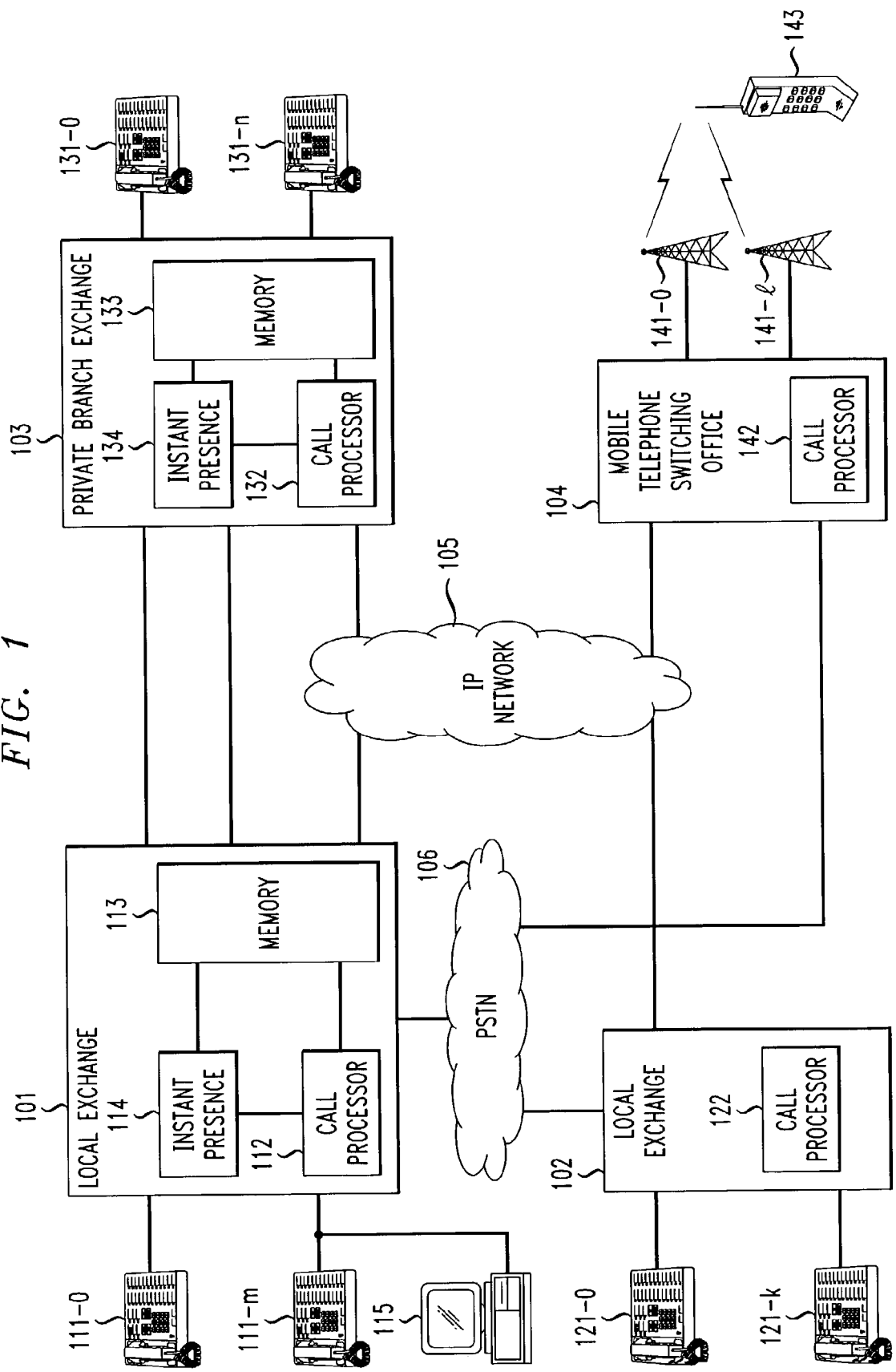
FIG. 1 illustrates in block diagram form the overall architecture of the present instant presence systems and a communications environment in which it is operational.

FIG. 1 illustrates in block diagram form the overall architecture of the instant presence system 114 and a typical environment in which it is operational. The subscribers are typically equipped with one or more of a personal computer 115, hand held computing device (not shown), telephone station set 111-0, cellular communication device 143, or other subscriber communication device, collectively termed "subscriber terminal equipment" herein. The subscriber's terminal equipment 111-0 is generally served by the Public Switched Telephone Network (PSTN) which consists of a plurality of Local Exchange Systems 101, 102 interconnected via an Inter-Exchange Carrier Network 106, with each Local Exchange System 101, 102 serving a plurality of subscriber terminal equipment (111-0 to 111-m, 121-0 to 121-k) under control of an associated call processor 112, 122. Alternatively, the subscriber can be served by a Private Branch eXchange (PBX) 103 which is used to provide communication services to a plurality of subscriber terminal equipment (131-0 to 131-n) under control of a call processor 132 and interconnect the subscriber terminal equipment via trunks to the Public Switched Telephone Network. The physical connection that supports this communication connection is typically effected from subscriber's terminal equipment 110-0 through the Local Exchange System 101 of the Public Switched Telephone Network (PSTN).

Alternatively, the subscriber's terminal equipment, in the case of cellular communication device 143, is connected via the Mobile Telecommunications Switching Office (MTSO) 104 to the Public Switched Telephone Network (PSTN). The Mobile Telecommunications Switching Office (MTSO) 104 contains a mobile telecommunication call processor 142 which controls the operation of Mobile Telecommunications Switching Office (MTSO) 104 to provide the telephone connectivity between base stations 141-0 and 141-1 and to Public Switched Telephone Network PSTN 106 and data communication network 106. Base stations 141-0 and 141-1 communicate with mobile subscriber station 143 using RF channels that convey both command messages as well as data, which may represent voice signals being articulated at the mobile subscriber station 101 and the far-end party. The control channels that are available in this cellular mobile telecommunication system are used to setup the communication connections between the mobile subscriber stations 143 and the base station 141-0. When a call is initiated, the control channel is used to communicate between the mobile subscriber station 143 involved in the call and the local serving base station 141-0. The control messages locate and identify the mobile subscriber station 143, determine the dialed number, and identify an available voice/data communication channel consisting of a pair of radio frequencies and orthogonal coding which is selected by the base station 141-0 for the communication connection. The radio unit in the mobile subscriber station 143 retunes the transmitter-receiver equipment contained therein to use these designated radio frequencies and orthogonal coding.

The instant presence system 114 is connected to at least one data communication medium 105 (such as the Internet) to thereby enable the telephone communication system hat serves the subscriber to obtain data communication connections with the instant presence system 114, as described in more detail below. The resources illustrated herein are selected for the purpose of illustrating the concept of the instant presence system and are not intended to limit the applicability of this concept to other network implementations.

Operation of the Instant Presence System to Identify a Subscriber Location

Figure 2:
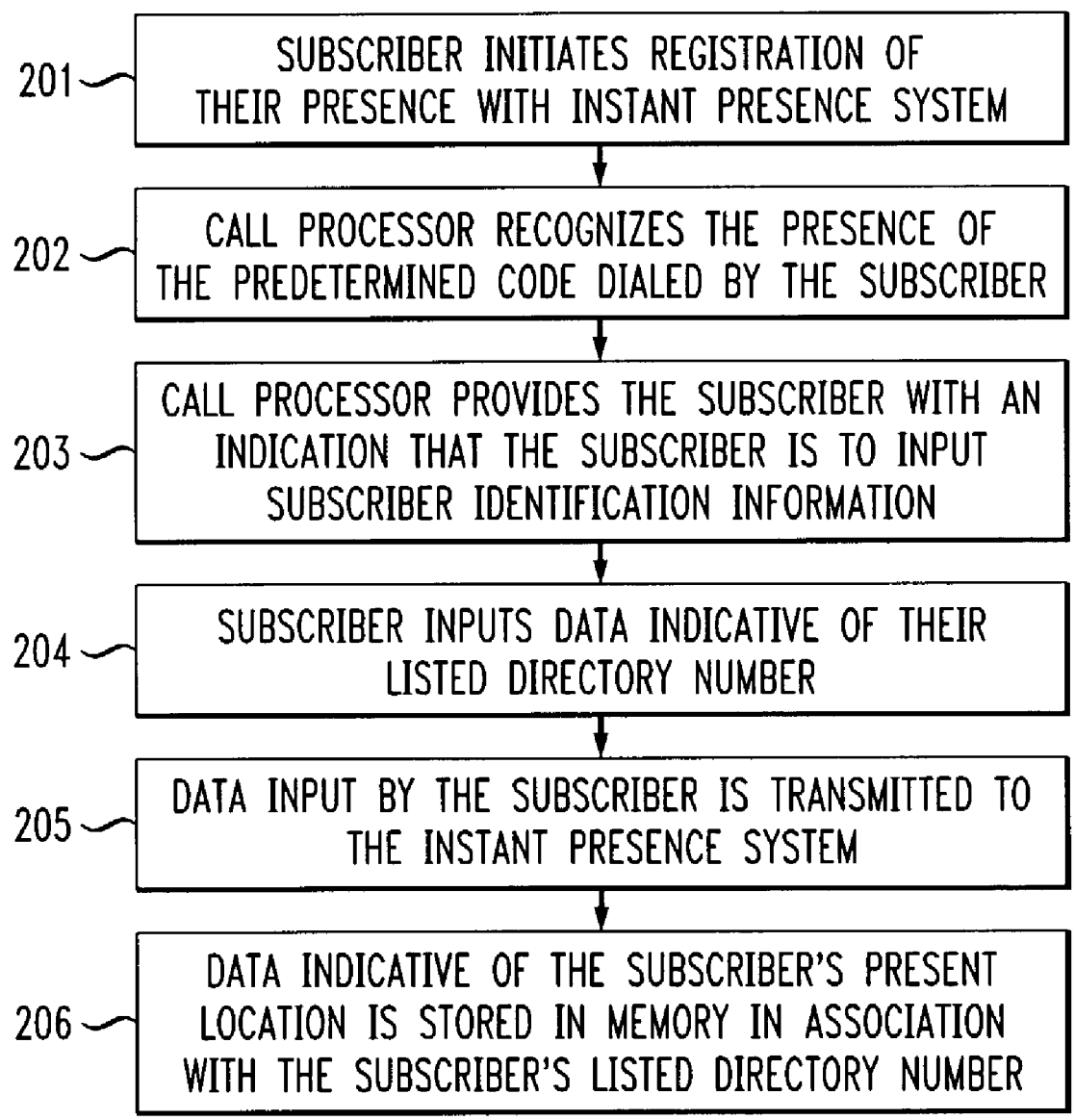
FIG. 2 illustrates in flow diagram form the operation of the present instant presence system to determine a present location of a subscriber.

FIG. 2 illustrates in flow diagram form the operation of the present instant presence system to determine a present location of a subscriber, who for the purpose of this description is assumed to have an assigned telephone station set 110-m. The telephone number of the telephone station set 110-m is termed the subscriber's listed directory number herein to indicate that this is the telephone number that is used by the Public Switched Telephone Network to identify the subscriber's service location and to contact the subscriber. A typical example of a subscriber listed directory number is the subscriber's home telephone number.

At step 201, a subscriber, located at telephone station set 110-0 initiates registration of their presence with instant presence system 114 by going off hook on the telephone station set 110-0 and dialing a predetermined code to activate the instant presence registration process. At step 202, the call processor 112 that serves the local exchange 101 recognizes the presence of the predetermined code dialed by the subscriber and, at step 203, provides the subscriber with an indication that the subscriber is to input subscriber identification information. At step 204, the subscriber inputs data, typically in the form of a dialed number indicative of the subscriber's listed directory number, via the keypad of the telephone station set 110-0. The data input by the subscriber is transmitted at step 205 by the call processor 112, along with the identity of the telephone station set 110-0 to the instant presence system 114, where, at step 206, the data indicative of the subscriber's present location (telephone number of telephone station set 110-0) is stored in memory 113 in association with the subscriber's listed directory number.

As the subscriber moves among various telephone station sets, each time the subscriber dials into the instant presence system, the data stored in memory 113 that identifies the subscriber's present location is updated. The call processor 112 may serve to collect and forward the call presence data as noted above or it may simply, in response to receipt of the predetermined code to activate the instant presence registration process, complete a call connection from the telephone station set 110-0 to the instant presence system 114 to enable the subscriber to directly interact with the instant presence system.

Furthermore, the subscriber may move among local exchanges, rather than just change location within a single local exchange. For example, the subscriber may move to a location served by telephone station set 121-0 and, in activating the instant registration process described above, the call processor 122 in local exchange 102 recognizes that the subscriber's listed directory number is one that is served by another local exchange 101. The call processor 122 forwards the instant presence data to the call processor 112 of local exchange 101 via the IP Network 105 in the form of a data message. This enables the subscriber to activate their instant presence service from any location, since the local exchanges forward data among themselves via IP Network 105. A similar process in executed where the subscriber is either served by or relocates to a telephone station set served by a private branch exchange 103. The subscriber's listed directory number for their office would typically be a number that is part of the numbering plan of private branch exchange 103. As the subscriber moved within offices in a business location served by private branch exchange 103, the instant presence system 134 of the private branch exchange 103 operates in a manner that is analogous to that described above for the instant presence system 114 located in the local exchange 101. Also, the forwarding of information to an instance of an instant presence system can be implemented even though the subscriber is served by several listed directory numbers. Thus, the subscriber can input the telephone number of telephone station set 131-n, served by private branch exchange 103, into their home instant presence system 114 to enable calls directed to the subscriber's home to be forwarded to their present location. The subscriber can also input the telephone number of telephone station set 131-n, served by private branch exchange 103, into their office instant presence system 134 to enable calls directed to the subscriber's office to be forwarded to their present location.

Operation of the Instant Presence System to Complete an Incoming Call

Figure 3:
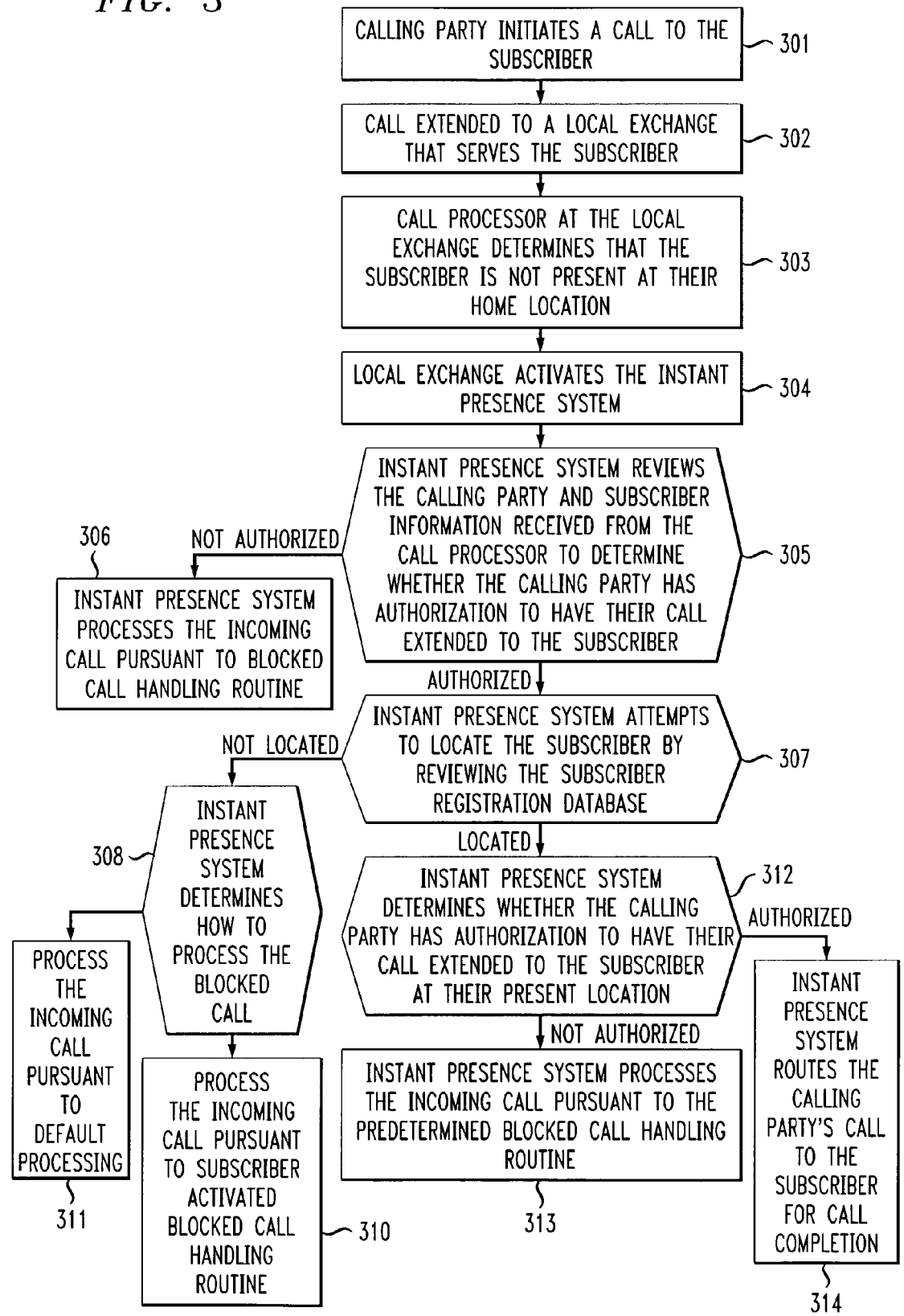
FIG. 3 illustrates in flow diagram form the operation of the present instant presence system to complete an incoming call to a present location of a subscriber.

FIG. 3 illustrates in flow diagram form the operation of the present instant presence system 114. Assume for the purpose of this description that the subscriber is assigned telephone station set 111-m as their home location but is presently located at a site that is served by telephone station set 111-0 and the subscriber has registered the telephone number of telephone station set 111-0 with the instant presence system 114. The calling party, located at telephone station set 121-k, initiates a communication connection to the subscriber at step 301 in well-known fashion by dialing the listed directory number of the subscriber. The call processor 122 of local exchange 102 determines at step 302 that the subscriber is served by local exchange 101 and extends a call connection via inter-exchange carrier 106 to local exchange 101. The call processor 112 at local exchange 101 determines at step 303 that the subscriber is not present at their home location and at step 304 activates the instant presence system 114 that serves the subscriber. The instant presence system 114, at step 305, reviews the calling party and subscriber information received from the call processor 112 to determine whether the calling party has authorization to have their call extended to the subscriber.

In particular, the subscriber can create a set of filters and/or a call location policy that limits the operation of the instant presence system 114 to avoid the burden of forwarding all incoming calls to the subscriber. If the calling party does not constitute one of the class of authorized calling parties or is not on the subscriber's approved caller list, at step 306 the instant presence system 114 processes the incoming call pursuant to the predetermined blocked call handling routine activated by the subscriber or default processing by the instant presence system 114, such as forwarding the incoming call to a message system or a recorded announcement, or completing the incoming call to telephone station set 111-m to let it ring through.

If the calling party at step 303 passes muster, the instant presence system 114 at step 307 attempts to locate the subscriber by reviewing the subscriber registration database. If the instant presence system 114 cannot locate the subscriber as determined at step 307, then at step 308 the instant presence system 114 determines whether to process the incoming call pursuant to the predetermined blocked call handling routine in step 310 activated by the subscriber or default processing by the instant presence system 114 in step 311, such as forwarding the incoming call to a message system or a recorded announcement, or completing the incoming call to telephone station set 111-m to let it ring through.

If the instant presence system 114 at step 307 determines where the subscriber is presently located, then the instant presence system 114 determines at step 312 whether the calling party has authorization to have their call extended to the subscriber at their present location. In particular, the subscriber can create a set of location-specific filters and/or a call location policy that limits the operation of the instant presence system 114 to avoid the burden and cost of forwarding all incoming calls to the subscriber. If the calling party does not constitute one of the class of authorized calling parties or is not on the subscriber's approved caller list, at step 313 the instant presence system 114 processes the incoming call pursuant to the predetermined blocked call handling routine activated by the subscriber or default processing by the instant presence system 114, such as forwarding the incoming call to a message system or a recorded announcement, or completing the incoming call to telephone station set 111-m to let it ring through. If the calling party is authorized at step 312, then at step 314 the instant presence system 114 routes the calling party's call to the subscriber for call completion.

SUMMARY

The instant presence system authoritatively determines the present communication location of a subscriber to simplify the process of identifying a present location of a roaming subscriber. This enables the communication network to complete a communication connection from a calling party to the called party with certainty.

What is claimed is:

1. A subscriber location determination system operable in a communications network for extending an incoming call to a determined present communication location of a subscriber, who is the called party comprising:

means, located in said communication network, for storing subscriber location data that identifies a present communication location in said communications network for a subscriber, who is the called party;

means, responsive to receipt of an incoming call from a calling party and directed to a listed directory number of said subscriber, for retrieving said stored subscriber location data from said means for storing;

means for extending said incoming call to a communication location in said communications network identified by said retrieved subscriber location data when said present communication location in said communications network for said subscriber differs from said listed directory number of said subscriber, means for determining an identity of said calling party;

means for comparing said determined identity of said calling party with call filter data stored in said means for storing subscriber location data; and means, responsive to aid means for comparing authorizing completion of said incoming call, for activating said means for extending.

2. The subscriber location determination system of claim 1 further comprising:

means for receiving subscriber location data from said subscriber indicative of a present communication location in said communications network for said subscriber.

3. The subscriber location determination system of claim 2 wherein said means for receiving subscriber location data comprises:

means for detecting a telephone number of a terminal device from which the subscriber transmits said subscriber location data.

4. The subscriber location determination system of claim 1 wherein said means for comparing comprises:

means for comparing said determined identity of said calling party with authorized calling party identification data stored in said means for storing subscriber location data; and means for comparing said determined identity of said calling party with data indicative of said present subscriber communication location in said communications network stored in said means for storing subscriber location data.

5. The subscriber location determination system of claim 1 wherein said means for retrieving further comprises:

means, responsive to said means for comparing failing to authorize completion of said incoming call, for redirecting said incoming call to an alternate destination.

6. A method of operating a subscriber location determination system operable in communications network for extending an incoming call to determined present communication location of subscriber, who is the called party, comprising the steps of;

storing in a memory, subscriber location data that identifiers a present communication location in said communications network for subscriber, who is the called party;

retrieving, in response to receipt of an incoming call from a calling party and directed to a listed directory number of said subscriber, said stored subscriber location data from said memory; and extending said incoming call to a communication location in said communications network identified by said retrieved subscriber location data when said present communication location in said communications network for said subscriber differs from said listed directory number of said subscriber;

determining an identity of said calling party;

comparing said determined identity of said calling party with all filter data stored in said means for storing subscriber location data; and activating, in response to said step of comparing authorizing completion of said incoming call, said step of extending.

7. The method of operating a subscriber location determination system of claim 6 further comprising the step of:

receiving subscriber location data from said subscriber indicative of a present communication location in said communications network for said subscriber.

8. The method of operating a subscriber location determination system of claim 7 wherein said step of receiving subscriber location data comprises:

detecting a telephone number of a terminal device from which the subscriber transmits said subscriber location data.

9. The method of operating a subscriber location determination system of claim 6 wherein said step of comparing comprises:

comparing said determined identity of said calling party with authorized calling party identification data stored in said memory; and comparing said determined identity of said calling party with data indicative of said present subscriber communication location in said communications network stored in said memory.

10. The method of operating a subscriber location determination system of claim 6 wherein said step of retrieving further comprises:

redirecting, in response to said step of comparing failing to authorize completion of said incoming call, said incoming call to an alternate destination.

* * * * *